United States Patent
de Kinkelder

[15] 3,707,305
[45] Dec. 26, 1972

[54] AUTOMATIC SPRAY FLUID CONTROL DEVICE

[72] Inventor: Petrus Johannes Alloysius de Kinkelder, 42, Zuiderlaan, Zevenaar, Netherlands

[22] Filed: Feb. 17, 1971

[21] Appl. No.: 116,060

[52] U.S. Cl. .................... 239/62, 239/155, 318/675
[51] Int. Cl. ............................................. B05g 1/30
[58] Field of Search ........ 239/62, 146, 155; 318/675; 251/289

[56] References Cited

UNITED STATES PATENTS

| 3,587,971 | 6/1971 | Ross | 239/155 |
| 2,924,761 | 2/1960 | Kuhn, Jr. et al. | 318/675 X |
| 3,550,866 | 12/1970 | Swenson | 239/146 X |

Primary Examiner—Lloyd L. King
Assistant Examiner—Michael Y. Mar
Attorney—Sughrue, Rothwell, Mion, Zinn & Macpeak

[57] ABSTRACT

An automatic fluid control device designed to be combined with spray apparatus for controlling the flow of insecticide, fertilizer and the like is provided. The fluid control provides a valve responsive to a manual control and an automatic control governed by the speed of the vehicle carrying the spray apparatus. A pair of scanners correlates the vehicle speed with the spray flow by causing the valve plug to meter the flow as it rotates. The manual control displaces the valve plug along its longitudinal axis to provide a cumulative control of the fluid flow.

7 Claims, 4 Drawing Figures

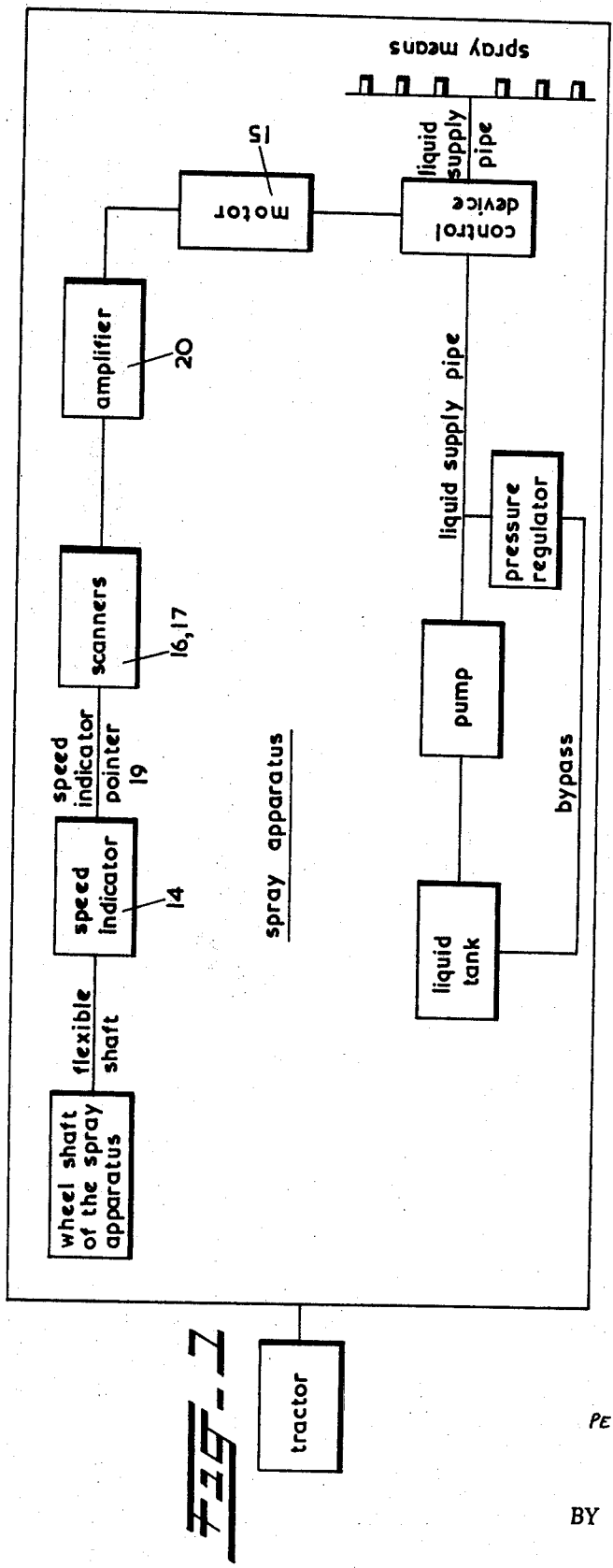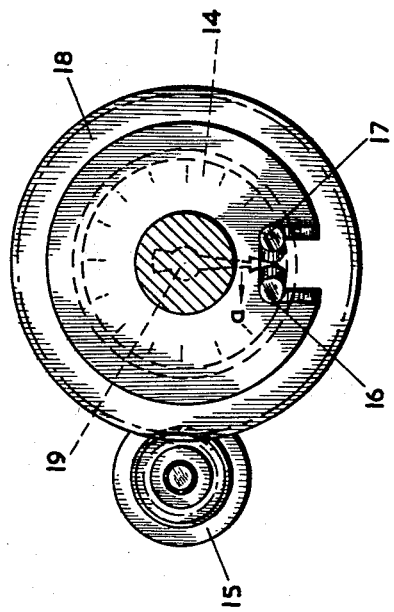

AUTOMATIC SPRAY FLUID CONTROL DEVICE

BACKGROUND OF THE INVENTION

This invention relates to an automatic delivery adjusting device and in particular to a device for adjusting the spray liquid supply to the spray means of a spraying apparatus which is generally carried on a tractor drawn trailer. The liquid can be insecticide, fungicide, fertilizer and the like. In normal operation, the liquid is sprayed on trees and plants during movement of the spray apparatus between two planting rows. During this operation, the spray liquid quantity has to be adjusted in accordance with several factors, such as the type of plant, the wind intensity, the form of sprayer and the tractor speed. When spraying, it is very difficult to maintain a predetermined vehicle speed. After each pass between two planting rows, the spray apparatus has to be turned to 180° and to be moved to the next row during which the apparatus is virtually stopped.

SUMMARY OF THE INVENTION

It is the object of the present invention to provide a device for adjusting the spray liquid supply to the spray means of a spraying apparatus so that apparatus speed variation is taken into account; also to permit a predetermined adjustment of the liquid supply in dependence on the other working factors.

According to the invention, a device for adjusting the spray liquid supply to the spray means of a movable spray apparatus for chemical insecticides, fungicides, fertilizers and the like comprises a valve mounted in the liquid supply pipe in which the magnitude of the passageway of the valve is variable by varying the valve position in a predetermined direction and the magnitude of the passageway is further variable by changing the valve position independent of the first cited variation in a second direction diverging from first mentioned direction.

In a preferred embodiment of the invention, the first valve position variation can be carried out by hand by means of an adjusting means whereas the second valve position variation is accomplished by a control means being dependent on the speed of rotation of a wheel shaft of the spraying apparatus.

The valve contains a cylindrical plug having a bore shaped passageway in the neutral position of which its axis is in alignment with the axis of the liquid supply pipe. The plug is movable in a direction perpendicular to the liquid supply pipe axis by means of the adjusting means and rotatable around its axis by means of the control means.

Preferably the bore in the plug is dimensioned so that an almost linear relation is obtained between the number of revolutions of the wheel shaft and the liquid quantity passed.

BRIEF DESCRIPTION OF THE DRAWINGS

All the foregoing and still further objects and advantages of the invention will become apparent from a study of the following specification taken in conjunction with the accompanying drawings in which:

FIG. 1 shows a block diagram of the present invention;

FIG. 4 shows a section view taken along line IV-IV of FIG. 2 disclosing the relation of the scanners and vehicle speed.

DESCRIPTION OF THE PREFERRED EMBODIMENTS

Figure 2:
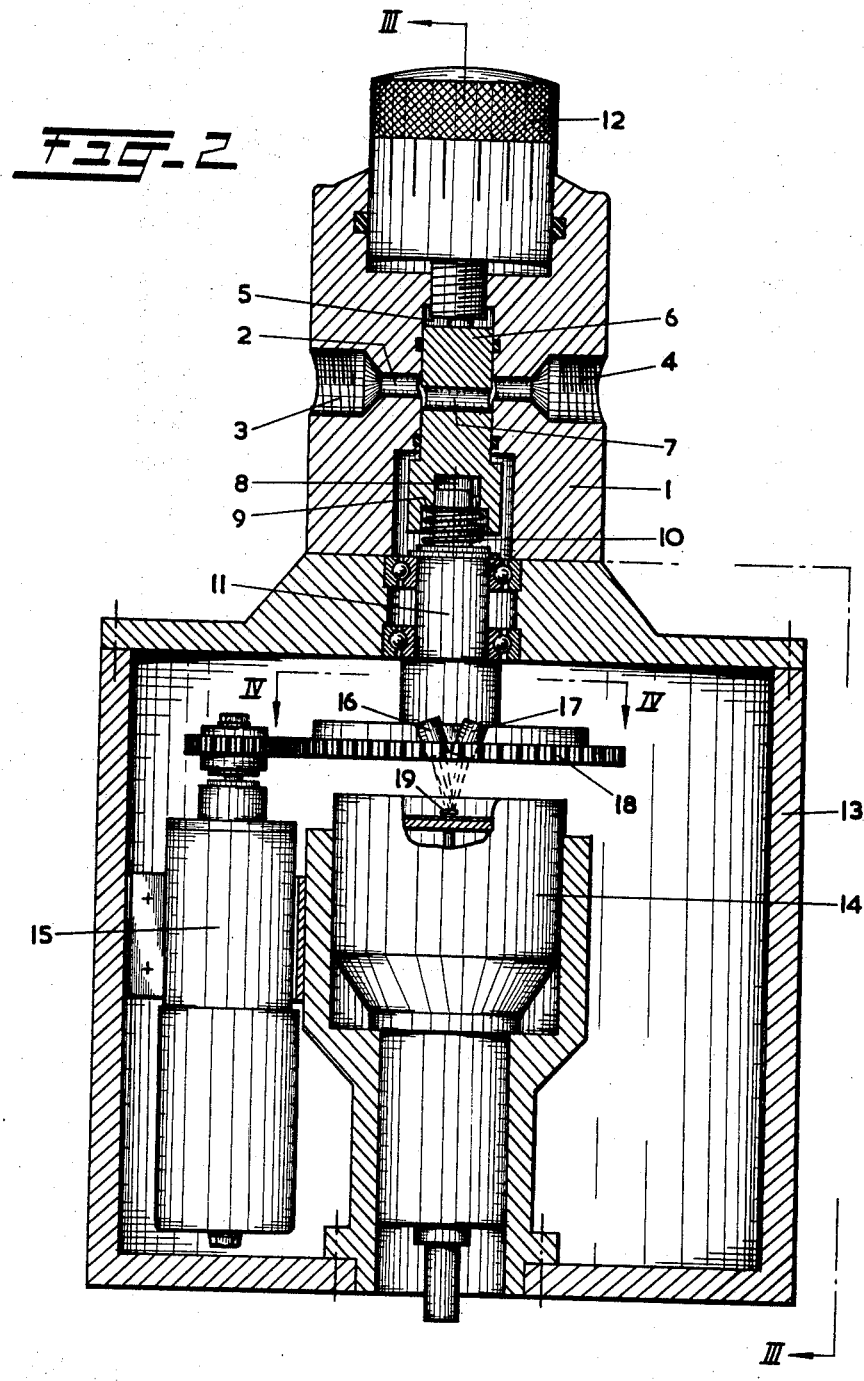
FIG. 2 shows a section view of a preferred embodiment of the device according to the invention.

Referring to the FIGS., FIG. 1 shows a simple block diagram of the spray apparatus which is generally carried on a tractor drawn trailer. One of the wheel shafts of the spray apparatus is coupled in a suitable manner, for instance by means of a flexible shaft to a revolution counter or a speed indicator 14 the pointer 19 of which is scanned by scanners 16, 17. The scanning signal being amplified by an amplifier 20 is used for energizing an electric motor 15 for operating the control device according to the invention in dependence on the spray apparatus apeed. The control device controls the supply of liquid through a liquid supply pipe to a nozzle means. The liquid is supplied from a liquid tank through a pump. For an efficient operation it is necessary that the liquid be supplied to the control device under a constant pressure. The constant pressure is accomplished by using a by pass and a pressure regulator.

In the illustrated embodiment, the device for adjusting the spray liquid supply to the spray means of a spray apparatus comprises a metal block 1 including two bores perpendicular to each other. Horizontal bore 2 is provided with two widenings 3 and 4 at its ends for insertion in the liquid supply pipe running from a liquid tank to a spray means. Vertical bore 5 accommodates the valve which in the illustrated preferred embodiment is a cylindrical plug 6 having a bore 7. The lower edge of said plug is provided with a recess 8 including a shoulder 9. A spring 10 is present within the enlarged portion of the recess. Through the spring 10, the plug 6 rests on a shaft 11.

At the opposite end of the plug 6 is an adjusting button 12 which is accommodated at least partly in an enlarged portion of bore 5 so that rotation of the adjusting button 12 causes an axial movement of plug 6 against the spring 10. Consequently, the liquid supply can be adjusted in dependence on the operation factors by means of the button 12 which is provided with graduation and can be rotated by hand. In the drawings, by way of example, button 12 has been rotated so that bores 2 and 7 having the same cross-section overlap each other over almost 50 percent of their cross-sectional surface area so that in operation the valve of the device passes a liquid quantity almost half of the maximal liquid quantity which can be passed through the valve.

The above mentioned operation factors include not only the type of plant, the wind intensity, and the sprayer, but even the spray apparatus speed. In using the operation button 12, the spray apparatus speed is not taken into account since as soon as the liquid supply main valve is opened, plug 6 passes almost 50 percent of the maximal liquid supply without regard to any spray apparatus speed.

Figure 3:
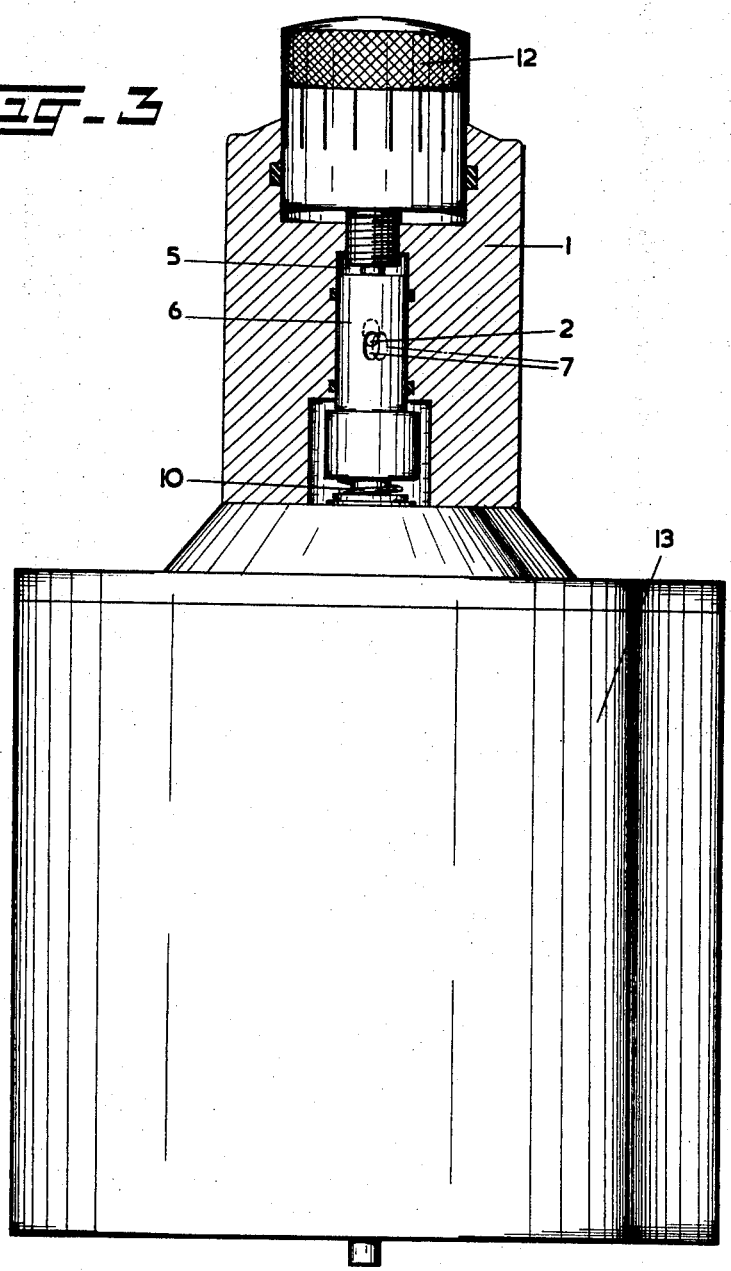
FIG. 3 shows a variation of the liquid passageway through the device.

In order to account for the spray apparatus speed, the valve block 1 has been mounted in a suitable manner on a casing 13 to house a revolution counter or speed indicator 14 and an electric motor 15 having two directions of rotation. The revolution counter 14 is coupled in a suitable manner, e.g., mechanically by means of a mechanical transmitting gearing or electrically to a wheel shaft of the spray apparatus so that the pointer of the counter indicates the spray apparatus speed. The position of the pointer is scanned and the scanning signal is used for energizing electric motor 15 which rotates plug 6 in its adjusted axial position around its axis in the one direction or the other direction causing a variation of the surface area of the overlapping bores 2 and 7. FIG. 3 shows an example of an overlapping area surface variation. Bore 7 has been moved from the aligned position at the foot of bore 2 to the right-handed position. The aligned position has been achieved by axial movement of plug 6 by means of button 12. The movement of bore 7 from the aligned position to the right in which the overlapping area surface is substantially smaller than 50 percent and backwards is accomplished by rotation of plug 6 around its axis by means of electric motor 15 under control of the revolution counter 14 through a scanning means.

Although it is possible to vary the scanning means used, the preferred embodiment as shown in FIGS. 1 and 4 comprises two scanners or photocells 16 and 17 scanning the position of the revolution counter pointer 19 and mounted in a recess of above-mentioned supporting shaft 11 on which at the opposite side plug 6 is resting through spring 10. The scanners can be represented by photo-electrical switches, contact-free switches or micro-switches available commercially. If the spray apparatus speed changes, for instance the spray apparatus speed is increased, the pointer 19 will be moved in the direction of arrow a in FIG. 4 and scanner 16 is energized. The scanner produces a signal for energizing motor 15 in such a direction that transmission gear 18 being fixed to supporting shaft 11 is rotated so that the shaft 11 is also rotated in the direction of arrow a. Motor is rotated until the energization of the scanner is ended and the pointer 19 lies precisely between the scanners 16 and 17 again according to FIG. 4. The supporting shaft 11 is coupled to plug 6 in recess 8 so that the transmission gear causes plug rotation and change of the position of bore 7 with respect to bore 2. Consequently the rotation of plug 6 continues until the revolution counter pointer 19 stops; which indicates that the spray apparatus has a constant speed.

FIG. 3 shows an elliptical cross-section of bores 2 and 7. It will be obvious that the bores can be dimensioned in another way, preferably so that the cross-section has an almost linear relationship between the number of revolutions of the wheel shaft and the liquid quantity.

While the invention has been particularly shown and described with reference to a preferred embodiment thereof, it will be understood by those skilled in the art that various changes in form and details may be made therein without departing from the spirit and scope of the invention.

What is claimed is:

1. A device for controlling the flow of fluid comprising a fluid conduit adapted to be connected to a source of fluid, a valve body mounted in said fluid conduit, said valve body including a cylindrical bore and passageways in communication with the fluid conduit, a valve regulator means mounted in the valve body for controlling the flow of fluid, said valve regulator means including a cylindrical plug mounted in the cylindrical bore and positioned perpendicularly to the fluid flow, the plug having a passageway capable of being aligned with the passageway in the valve body, a first adjusting means for moving the valve regulator in one direction to vary the flow, said first adjusting means including a manually adjustable control member, means for producing a signal indicating the desired fluid flow, and a second adjusting means for moving the valve regulator in a second direction to vary the flow, said second adjusting means including a control means for positioning the valve regulator means in response to the variable signal, both adjusting means providing cumulative control of the total flow of fluid, whereby the plug of said valve regulator means is movable in a direction perpendicular to the fluid flow by the manually adjustable control member and rotatable around its axis by the control means in response to the variable signal to provide control of the fluid flow.

2. In combination a liquid spraying apparatus for dispensing chemical insecticides, fungicides, fertilizers and the like mounted on a vehicle and a device for controlling the flow of fluid comprising a fluid conduit, a source of liquid connected to the fluid conduit, a valve body mounted in the fluid conduit, a valve regulator means mounted in the valve body, a first adjusting means for moving the valve regulator in one direction to vary the flow of fluid, a second adjusting means for moving the valve regulator in a second direction to vary the flow, and means for indicating the speed of the vehicle on which the spray apparatus is mounted, said means for indicating the speed of the vehicle including a revolution counter pointer and a pair of scanner means, wherein the scanner means are responsive to the revolution counter pointer and generate a signal for positioning the valve regulator means, whereby the second adjusting means is actuated by the speed signal to regulate the fluid flow.

3. The combination of claim 2 wherein the pair of scanner means are connected to the valve regulator means and rotate with the valve regulator means.

4. The combination of claim 2 wherein the valve body includes a cylindrical bore and passageways in fluid communication with the fluid conduit and the valve regulator means includes a cylindrical plug mounted in the cylindrical bore having a fluid passageway capable of being aligned with the valve body passageways to meter the fluid flow, the plug is mounted with its longitudinal axis perpendicular to the fluid flow, whereby the first adjusting means moves the cylindrical plug in the direction of the longitudinal axis and the second adjusting means rotates the cylindrical plug to provide cumulative metering of the fluid flow.

5. The combination of claim 4 wherein the passageway of the cylindrical plug is dimensioned in relation to the passageways of the valve body to provide a metering of fluid flow that is substantially linear to the speed of the vehicle.

6. The combination of claim 4 wherein the passageway of the cylindrical plug is elliptical.

7. The combination of claim 5 wherein the first adjusting means includes a screw threaded member for positioning the cylindrical plug; a spring means for biasing the cylindrical plug and the second adjusting means includes a counter means for determining the vehicle speed, gear means for rotating the cylindrical plug, and a motor for actuating the gear means.

* * * * *